United States Patent
Lindsay et al.

[19]

[11] Patent Number: 5,944,152
[45] Date of Patent: *Aug. 31, 1999

[54] APPARATUS MOUNTINGS PROVIDING AT LEAST ONE AXIS OF MOVEMENT WITH DAMPING

[75] Inventors: Richard Arthur Lindsay, Suffolk; Richard Graham Curry, Hants, both of United Kingdom

[73] Assignee: Vitec Group, PLC, Suffolk, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,587

[22] PCT Filed: Oct. 14, 1994

[86] PCT No.: PCT/GB94/02251

§ 371 Date: Apr. 8, 1996

§ 102(e) Date: Apr. 8, 1996

[87] PCT Pub. No.: WO95/10728

PCT Pub. Date: Apr. 20, 1995

[30] Foreign Application Priority Data

Oct. 14, 1993 [GB] United Kingdom ................ 93211176

[51] Int. Cl.$^6$ ..................................................... F16D 57/02
[52] U.S. Cl. ...................... 188/296; 188/293; 188/322.5
[58] Field of Search ............................. 74/574; 188/268, 188/290, 293, 325.5, 378–380; 248/183.1, 183.2; 267/140.14, 140.15; 348/373; 352/243; 396/419, 428

[56] References Cited

U.S. PATENT DOCUMENTS

| | | | |
|---|---|---|---|
| 3,907,079 | 9/1975 | Chapman | 188/290 |
| 4,351,515 | 9/1982 | Yoshida . | |
| 4,742,998 | 5/1988 | Schubert | 267/140.14 |
| 4,759,534 | 7/1988 | Hartel | 267/140.14 |
| 4,899,854 | 2/1990 | Cartoni | 188/290 |
| 4,973,031 | 11/1990 | Takano et al. | 267/140.14 |
| 5,176,368 | 1/1993 | Shtarkman | 267/140.14 |
| 5,249,784 | 10/1993 | Murakami et al. | 267/140.14 |

FOREIGN PATENT DOCUMENTS

| | | |
|---|---|---|
| 0 209 145 | 1/1987 | European Pat. Off. . |
| 2111171 | 6/1983 | United Kingdom . |
| 2215810 | 9/1989 | United Kingdom . |
| 2242762 | 10/1991 | United Kingdom . |
| 2261048 | 5/1993 | United Kingdom . |

*Primary Examiner*—Chris Schwartz
*Attorney, Agent, or Firm*—Kenyon & Kenyon

[57] ABSTRACT

The disclosure relates to a viscous damper of the labyrinth ring type for incorporation in a mounting for a TV or video camera for damping pan or tilt movement of the camera. The damper has a stator (10) having a multiplicity of upstanding concentric annular fins (12) and a rotor (17) having a corresponding multiplicity of concentric annular fins (32) projecting downwardly which interleaf with clearance with the upstanding flanges of the stator, the space between the fins being filled with a viscous fluid to provide a resistance to relative movement between the rotor and stator. The rotor is adjusted with respect to the stator by a motor driven lead screw. A speed sensor measures speed of the rotor with respect to the stator and torque applied to the camera by the hand control to pan or tilt the camera is measured by a strain gauge associated with the hand control. A control system is provided for the motor embodying a microprocessor preprogrammed with one or more algorithms coordinating torque and speed. Thus the viscous damper may be controlled to provide a resistance torque to movement which rises generally linearly with speed as detected by the speed sensor to a certain level whereafter the resistance is maintained constant.

17 Claims, 5 Drawing Sheets

ACTIVE DRAG

WITHOUT TORQUE SENSOR

NOMINAL LABYRINTH ENGAGEMENT FOR ALTERNATIVE DRAG CHARACTERISTICS (CORRECTED FOR TORQUE/ENGAGEMENT RELATIONSHIP)

LABYRINTH ENGAGEMENT, $d = d_0 \cdot s$  WHERE $s = f(z, a, t)$

WITH TORQUE SENSOR FIG. 5.
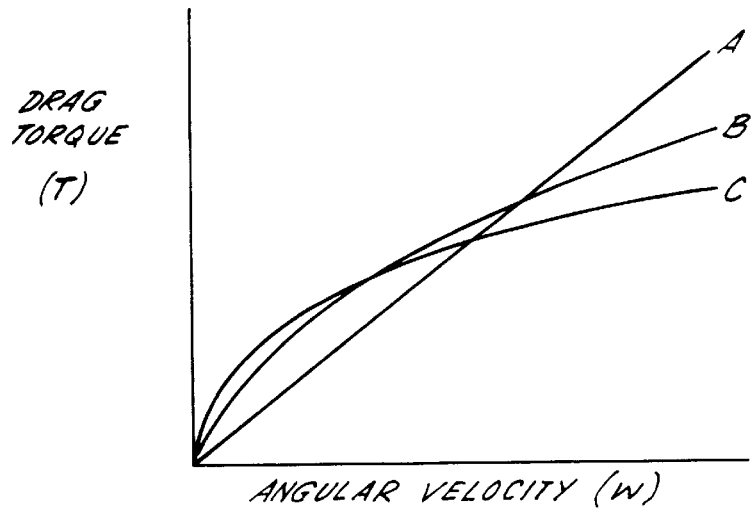
FIG. 6. ALTERNATIVE NOMINAL DRAG CHARACTERISTICS
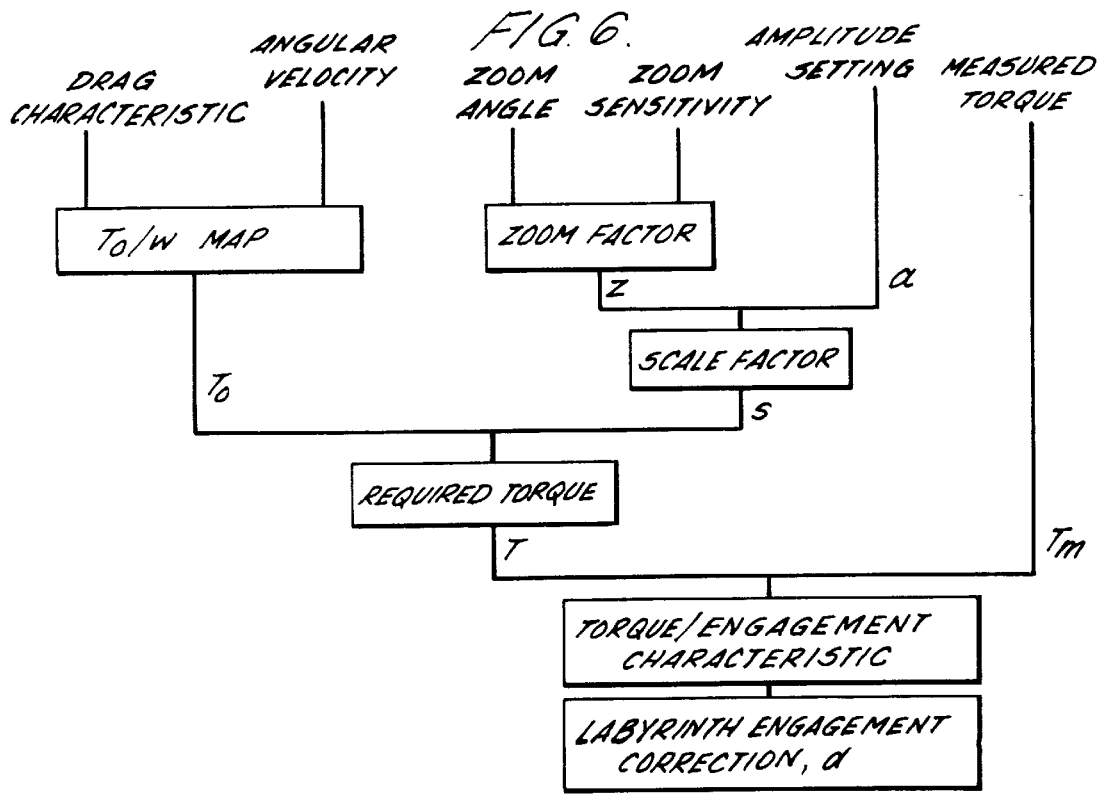

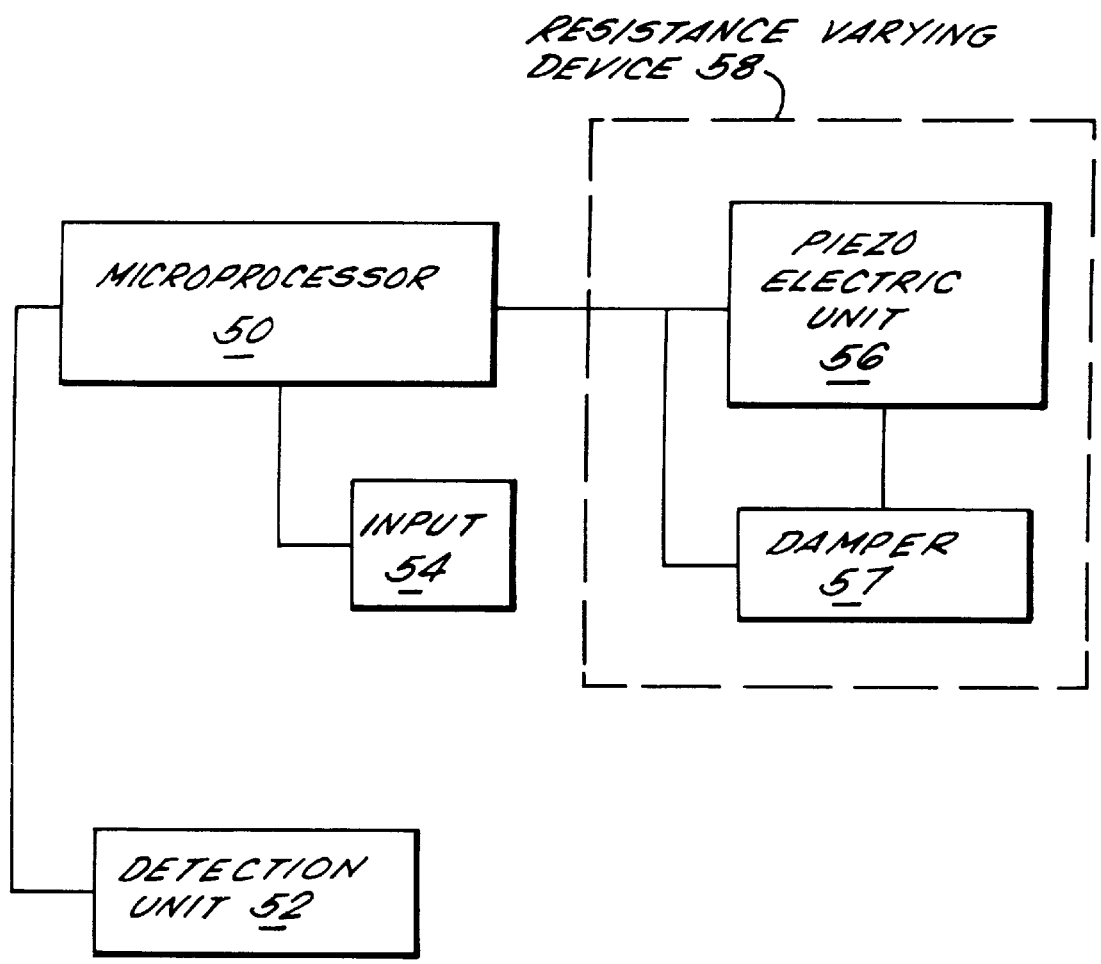

APPARATUS MOUNTINGS PROVIDING AT LEAST ONE AXIS OF MOVEMENT WITH DAMPING

FIELD OF THE INVENTION

This invention relates to apparatus mountings having at least one axis of movement and more specifically to manually movable mountings incorporating variable resistance devices for damping movement of the apparatus. The invention is particularly although not exclusively applicable to mountings for film, T.V. or video cameras which, typically, are moveable in at least pan and tilt modes.

BACKGROUND OF THE INVENTION

Various forms of dampers have been used in camera pan/tilt mountings, some, of the friction type, embodying inter-engaging sliding surfaces and others, of the viscous type, having relatively moveable surfaces with a viscous fluid therebetween sheared by the relative movement between the surfaces to provide resistance. Still other forms of dampers have embodied both friction and viscous components. Examples of such arrangements can be found in our U.S. Pat. No. 4,177,884 our International Patent Publication No. WO92/03683 and our International Patent Application No. PCT/GB93/00746.

The above arrangements are all essentially mechanical in nature and while it is normal to provide adjustment for varying a maximum resistance offered, the torque/speed characteristics of such dampers are inherent in their design and construction and cannot readily be varied thereafter.

SUMMARY OF THE INVENTION

This invention provides an apparatus mounting providing movement for the apparatus in at least one axis and damping means being provided for controlling the movement, the damping means comprising a variable resistance device for opposing movement of the mounting, electrically operated control means for the variable resistance device for varying the resistance in accordance with one or more variable parameters relating to movement of the mounting and means to detect variation in the parameter or parameters to cause the control means to vary the resistance device to provide a requisite resistance in accordance with variation in the parameter or parameters.

For example, means may be provided for detecting applied force and speed of movement and the control means may adjust the variable resistance to provide a resistance to movement which varies with speed in accordance with a predetermined relationship.

One such control means may include a micro-processor programed with an algorithm to provide the required resistance/speed characteristic. In the latter case the microprocessor may be adapted to receive different algorithms for the force/speed relationship for selection by the operator.

Furthermore the micro-processor may contain a number of algorithms for different force/speed relationships and means are provided for the operator to select a requisite algorithm.

In any of the above arrangements the control means may have further means for detecting ambient conditions for adjusting the variable force device to suit the conditions.

For example the means for detecting the ambient conditions may include means for detecting temperature and wind speed.

Also in any of the above arrangements the control means may include means for varying the variable resistance in accordance with adjustment of a camera parameter.

In one arrangement according to the invention the apparatus may comprise a camera having a zoom lens, and means may be provided for providing varying resistance to movement in response to change in focal length of the lens and thereby field of view of the lens.

Also in any of the above arrangements the mounting may provide pan and tilt movement of the camera and variable resistance devices for controlling movement of the camera in both pan and tilt are provided operated by the control means.

BRIEF DESCRIPTION OF THE DRAWINGS

The following is a description of some specific embodiments of the invention, reference being made to the accompanying drawings in which;

FIG. 5 is a graph of drag torque plotted against angular velocity for a system with a torque sensor;

FIG. 6 is a block diagram of a control system for achieving the characteristics of FIG. 5; and FIG. 7 is a block diagram showing the element of mounting according to the present invention.

DETAILED DESCRIPTION

Figure 1:
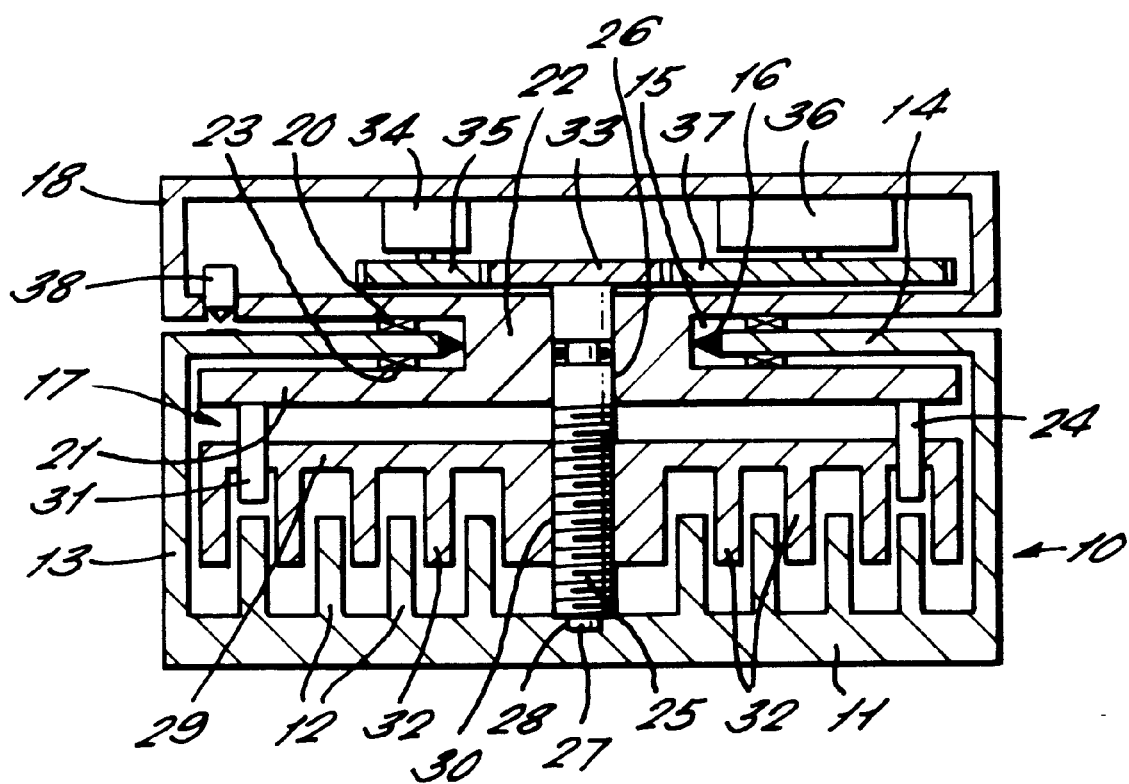
FIG. 1 is a diagrammatic illustration of a labyrinth type variable viscous damper for a camera mounting in accordance with the invention.

The drawings show a viscous damper of the labyrinth ring type for damping pan or tilt movement of a T.V./video camera in a camera mounting.

The damper comprises a stator 10 in the form of a hollow, circular cross-section housing having a base plate 11 formed with integral upstanding concentric annular fins 12, an annular outer wall 13 and an annular top wall 14 providing a central aperture 15 into the top of the housing. An annular seal 16 is mounted in the central aperture 15.

A rotor for the damper is indicated generally at 17 and comprises a hollow cylindrical hub 18 supported on the top wall of the stator on an annular thrust race 20. A circular drive plate 21 disposed within the stator housing has an upstanding boss 22 extending through the aperture 15 in the top plate in engagement with the seal 16 and is secured to the underside of the hub. A second annular thrust race 23 is disposed between the upper side of the drive plate and the underside of the hub. The drive plate has a pair of diametrically spaced downwardly projecting drive pins 24.

A lead screw 25 is rotatably mounted in a bore 26 at the centre of the drive plate 21 and extends downwardly thereof to the base plate 11 of the stator housing where the lead screw is formed with a short circular boss 27 which locates in a circular socket 28 in the base plate 11. The lead screw is thus supported for rotation in the stator housing.

A rotor plate 29 is located in the stator housing and has a central screw-threaded bore 30 in which the lead screw engages so that rotation of the lead screw raises and lowers the plate for a purpose described below.

The rotor plate 29 is coupled to the drive plate 21 to be rotatable therewith by the drive pins 24 which engage in bores 31 in the rotor plate. Raising and lowering the rotor plate by the lead screw raises and lowers the plate upward down the drive pins whilst maintaining the driving connection between the plates.

The rotor plate 29 has a number of downwardly projecting concentric annular fins 32 which interleave with clearance with the upstanding flanges 12 on the stator base plate 11 and the flanges 12 of the stator base plate 11 and the fins 32 of the rotor plate 29 is filled with a viscous fluid to provide resistance to relative movement between the rotor and stator. The seal 16 prevents loss of fluid between the boss 22 and aperture 15 in the top wall 14. Raising and lowering the rotor plate 29 by the lead screw 25 varies the labyrinth engagement or overlap between the fins 32 of the stator 10 and rotor to vary the "coupling" or viscous drag between the rotor plate 29 and the stator 10.

The upper end of the lead screw 25 projects into the hub 18 and carries a gear 33. A reversible electric drive motor 34, which may be a stepper rotor or a servo rotor is mounted on the hub to one side of the gear and has an output drive carrying a drive pinion 35 which meshes with the gear 33 to rotate the lead screw 25. Control of the lead screw 25 is effected through a rotary potentiometer 36 mounted in the hub on the other side of the gear 33 and carrying a pinion 37 meshing with the gear 33. A speed sensor 38 is mounted on the hub 18 facing a surface of the stator 10 for measuring the speed of the rotor plate 29 with respect to the stator 10. Torque applied to a camera (not shown) by hand control (not shown) to pan or tilt the camera is measured by a strain gauge (not shown) associated with the hand control.

Figure 2:
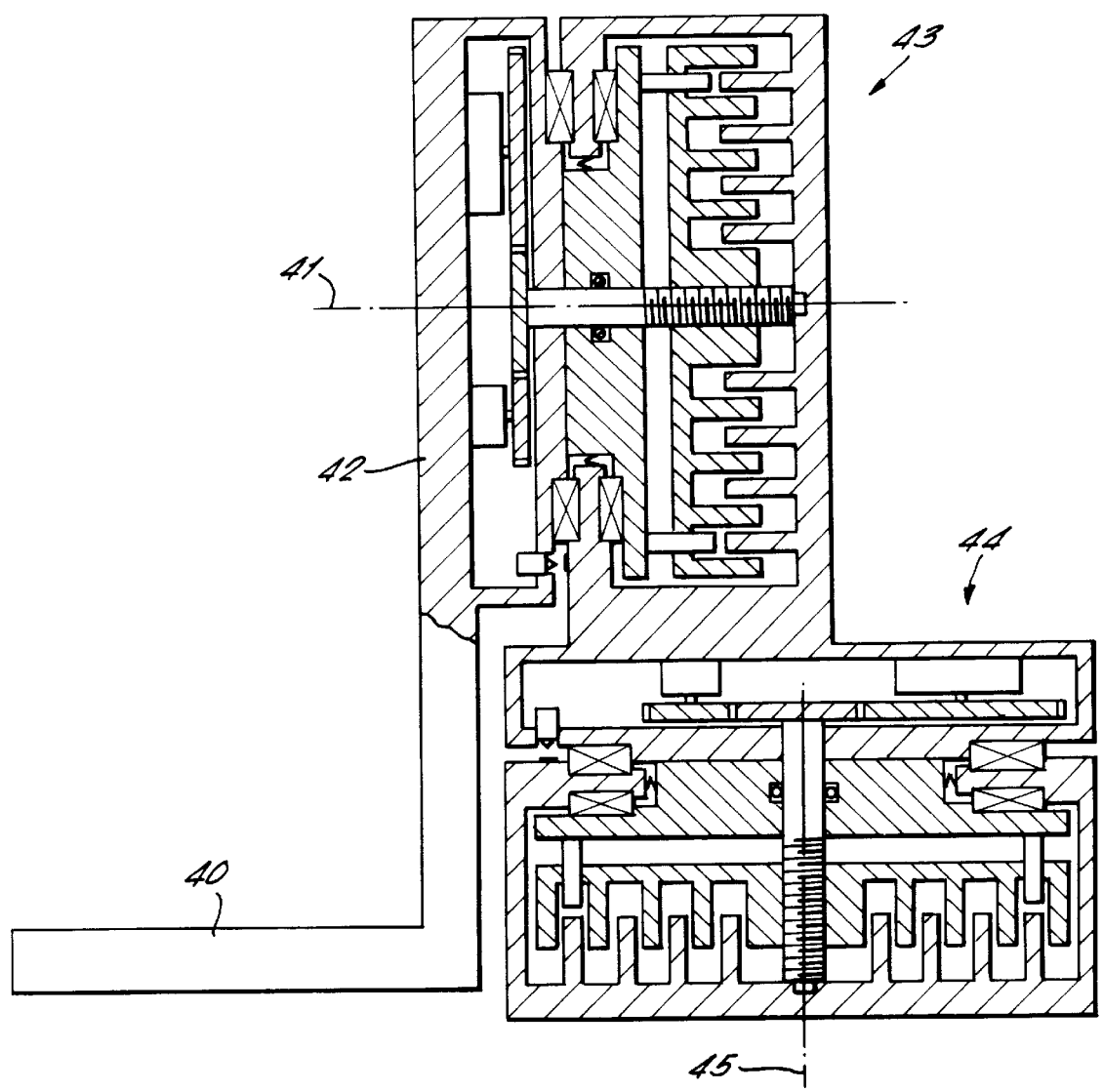
FIG. 2 is also a diagrammatic illustration showing two such dampers utilised in controlling pan and tilt movements of a camera platform.

FIG. 2 of the drawings shows two such dampers controlling pan and tilt movements of a camera platform 40. The platform is mounted for tilt movement about a horizontal axis 41 with an upright side wall 42 of the platform coupled to the rotor of one damper indicated at 43 which controls rotation about the horizontal axis 41. The stator of the damper is mounted on the rotor of a second damper 44 rotatable about a vertical axis 45 to control pan movement of the platform.

As shown in FIG. 7, a control system for a resistance varying device 58, e.g., the above-described variable viscous dampers, which resists pan and tilt movements of the mounting is provided embodying a microprocessor 50 pre-programmed with one or more algorithms coordinating torque and speed to provide a required relationship therebetween. In addition means can be provided for measuring ambient conditions, e.g., a direction unit 52, which may effect the control of the camera such as temperature which could affect the viscosity of the damper fluid, wind speed which could affect the control which the operator has over the camera, the adjustment of features of the camera such as a zoom lens to provide varying resistance with change in focal length and therefore field of view. In addition, the microprocessor may be programmed to suit particular operating characteristics which are the personal preferences of the user. By way of example, the mounting may have an input device to receive pre-recorded information on a magnetic card for controlling the damper in accordance with each operators' preference.

Finally, a manual control (not show) may be provided for adjusting the resistance, that is the amplitude of the characteristics of the damper.

Movement of the camera on its mounting in either the tilt or pan axes results in the damper providing a resistance torque to movement which rises generally linearly with speed of movement as detected by the speed sensor 19 to a certain level whereafter the resistance is maintained constant. That is but one torque speed characteristic and it would be appreciated that many other such characteristics may be pre-programmed for selection by the user as required.

As indicated above, the viscous damper provides varying resistance by adjustment of the spacing of the rotor and stator. Other means are available for varying the damping provided by a viscous damper including the use of electro-rheological fluids which change viscosity in accordance with electric fields. It is also envisaged that, as show in FIG. 7, one or more piezo electric devices 56 may be used for providing motive force for varying the level of damping in relation to an electrical signal in putting the invention into effect.

The motor drive for adjusting the viscous coupling is preferably of the stepper motor type or a DC servo motor in a controlled loop.

Figure 3:
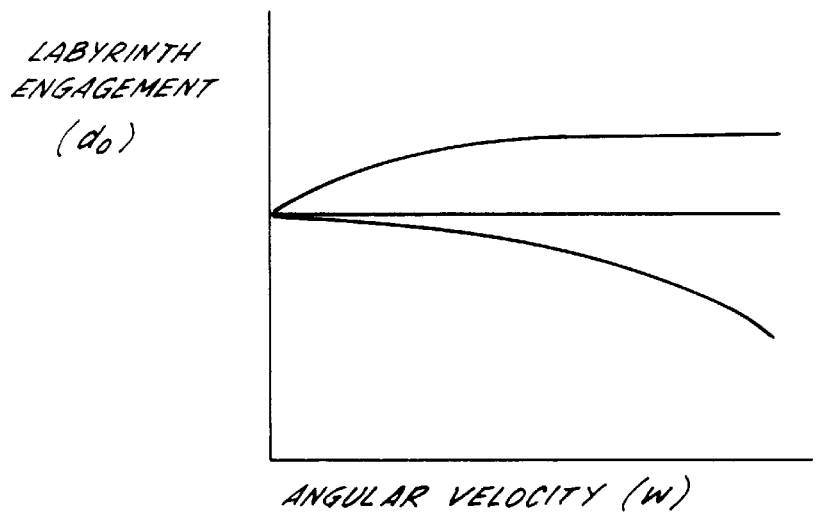
FIG. 3 shows a graph of labyrinth engagement plotted against angular velocity for different drag characteristics without a torque sensor.
Figure 4:
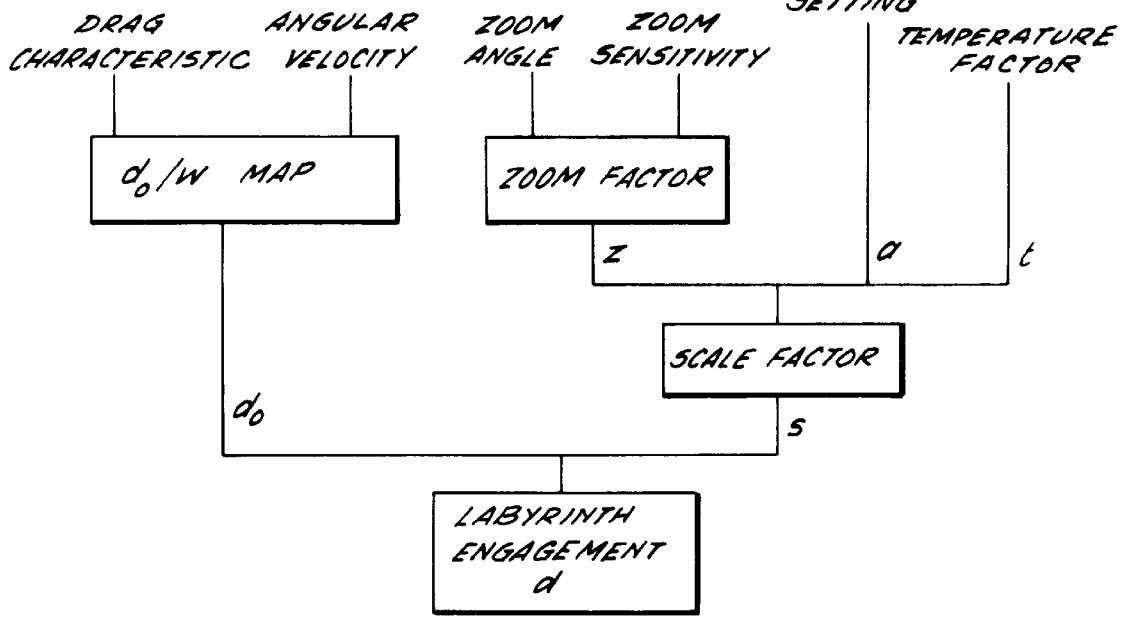
FIG. 4 illustrates in block diagram form a control system for achieving the characteristics of FIG. 3.

FIG. 3 of the drawings is a graph showing labyrinth engagement plotted against angular velocity for different drag characteristics and FIG. 4 is a block diagram of a corresponding control system.

FIG. 5 is a graph of drag torque plotted against angular velocity and FIG. 6 is a block diagram of a corresponding control system.

We claim:

1. A mounting for providing rotation about a first axis, the mounting comprising:

first and second members rotatably coupled to one another for rotation about the first axis;

means for providing a variable resistance to the rotation about the first axis of at least one of the first and second members relative to the other;

means for detecting a parameter relating to rotation of the at least one of the first and second members relative to the other; and electrically operated control means coupled to the variable resistance means and to the detecting means for varying the resistance provided by the variable resistance means based on a variation of the value of the parameter detected.

2. A mounting as claimed in claim 1, wherein the detecting means includes means for detecting a speed of rotation of the at least one of the first and second members relative to the other, wherein the control means controls the amount of resistance provided by the variable resistance means based on the detected speed of rotation in accordance with a predetermined relationship.

3. A mounting as claimed in claim 2, wherein the detecting means includes means for detecting a torque applied to the at least one of the first and second members about the first axis, wherein the control means controls the amount of resistance provided by the variable resistance means based on the detected applied torque and speed of rotation in accordance with a predetermined relationship.

4. A mounting as claimed in claim 2, wherein the control means include a microprocessor operating under the control of an algorithm corresponding to the predetermined relationship.

5. A mounting as claimed in claim 4, wherein the microprocessor is adapted to operate under a plurality of algorithms, wherein each of the algorithms corresponds to a different predetermined relationship.

6. A mounting as claimed in claim 5, wherein the microprocessor contains a plurality of algorithms, each algorithm corresponding to a different predetermined relationship, so that a corresponding algorithm may be selected by an operator.

7. A mounting as claimed in claim 1, further comprising means coupled to the control means for detecting at least one ambient condition, wherein the control means adjusts resistance provided by the variable resistance means based on the at least one ambient condition.

8. A mounting as claimed in claim 7, wherein the means for detecting the at least one ambient condition included means for detecting a temperature and a wind speed.

9. A mounting as claimed in claim 1, further comprising a rotary viscous damper including means for varying a drag of the damper.

10. A mounting as claimed in claim 9, wherein the damper comprises a stator having multiple annular plates and a rotor includes multiple annular plates interleaved with and spaced from the plates of the stator and wherein a viscous fluid fills spaces formed between the rotor plates and the stator plates, the mounting further comprising means for adjusting a separation of the rotor from the stator to vary an overlap between the rotor plates and the stator plates to vary the drag of the damper.

11. A mounting as claimed in claim 10, wherein the means for adjusting a separation of the rotor from the stator includes an electric motor for adjusting the separation of the rotor from the stator , wherein the motor is operated by the control means.

12. A mounting as claimed in claim 9, wherein the damper contains an electro-rheological fluid, the mounting further comprising means for generating a variable electric field in the electro-rheological fluid t o control the viscosity thereof.

13. A mounting as claimed in claim 9, wherein the damper contains an electro-rheological fluid and wherein the resistance device includes means for generating a variable electric field in the electro-rheological fluid to control the viscosity thereof.

14. A mounting as claimed in claim 1, wherein the variable resistance means includes a piezo-electro device for varying the resistance in accordance with a voltage supply from the control means.

15. A mounting as claimed in claim 1, wherein the control means controls the variable resistance means to vary the resistance based on an operator input.

16. A mounting as claimed in claim 15, wherein the control means includes an input for receiving data and wherein the control means adjusts the resistance based on the data received via the input.

17. A mounting as claimed in claim 1, further comprising a third member rotatably coupled to the first member for rotation relative to the first member about a second axis and wherein the variable resistance means provides a first resistance to rotation of the at least one of the first and second members about the first axis and provides a second resistance to rotation of at least one of the first and third members relative to the other about the second axis.

* * * * *